United States Patent [19]

Haas

[11] Patent Number: 5,115,432
[45] Date of Patent: May 19, 1992

[54] COMMUNICATION ARCHITECTURE FOR HIGH SPEED NETWORKING

[75] Inventor: Zygmunt Haas, Matawan, N.J.

[73] Assignee: AT&T Bell Laboratories, Murray Hill, N.J.

[21] Appl. No.: 449,201

[22] Filed: Dec. 12, 1989

[51] Int. Cl.$^5$ .......................... H04J 3/00; G06F 3/00; G06F 13/00

[52] U.S. Cl. .................................. 370/94.1; 395/725; 395/325

[58] Field of Search .................. 370/94.1, 60; 364/200, 364/900; 395/725, 325

[56] References Cited

U.S. PATENT DOCUMENTS

| | | | |
|---|---|---|---|
| 4,893,307 | 1/1990 | McKay et al. | 370/60 |
| 4,935,870 | 6/1990 | Burk, Jr. et al. | 364/200 |
| 4,961,133 | 10/1990 | Talati et al. | 364/200 |

OTHER PUBLICATIONS

The VMP Network Adapter Board(NAB) High-Performance Network Communication for Multiprocessors, pp. 175–187, 1988 ACM Towards a High Speed Man Architectur, 1989, IEEE, pp. 0619–0624.

An Analysis of Memnet: An Experiment in High-Speed Shared-Memory Local Networking, 1988 ACM, pp. 165–174.

Research Report—The Modular Communication Machine (MCM): An Architecture for High Performance Networks, H. E. Meleis and A. N. Tantawy, IBM Research Division.

Primary Examiner—Douglas W. Olms
Assistant Examiner—Min Jung
Attorney, Agent, or Firm—T. Stafford

[57] ABSTRACT

A new data communications architecture is disclosed in which high level communications services provided to a host processor are arranged into independent horizontal functions that are processed in parallel. Any conditional dependencies among the horizontal functions are resolved by a connector that interfaces the horizontal functions to an application layer of the host processor. Additionally, communication performance is enhanced by allowing adaptive specifications of a high-level protocol employed in the architecture for providing the high-level services. This adaptive specification may be initiated in response to changing user requirements or varying network parameters. Then, a high-level protocol specification is obtained by choosing appropriate values for parameters of the horizontal functions which are parametrically programmable.

10 Claims, 9 Drawing Sheets

HORIZONTALLY ORIENTATED
PROTOCAL STRUCTURE
(HOPS)

FIG.1

HORIZONTALLY ORIENTATED
PROTOCOL STRUCTURE
(HOPS)

COMMUNICATION ARCHITECTURE FOR HIGH SPEED NETWORKING

TECHNICAL FIELD

This invention relates to communications systems and/or networks and, more particularly, to data communications architectures and protocols.

BACKGROUND OF THE INVENTION

The transmission speed in wide-, metropolitan-, and local-area networking has increased over the past decade six orders of magnitude, from Kbps to Gbps. During the same time period, however, the speed of commercial processing units that can be employed as communications processors has increased only two to three orders of magnitude. Additionally, data communications architectures have structured their services and protocols into a hierarchy of vertical layers. Typically, the services and protocols of an architecture are divided into low-level, i.e., low-layer, services and protocols, and high-level, i.e., high-layer, services and protocols. This layering requires additional software processing to handle functional replication and the overhead inherent in the resulting interlayer interfaces. The discrepancy between transmission speed and processing speed, coupled with the extra processing requirements of the data communications architecture, creates a so called "bottleneck" in the data communications process. This bottleneck exists because, for any communication, the time required by the software to process high-level protocols is greater than the corresponding time required by the transmission facility. Today, the mismatch between a network's transmission speed and its high-level processing ability is so great that the advantages of having high-speed transmission facilities present in a network are subsumed in the delays caused by the large processing requirements of the high-level functionality.

Prior high level data communications protocols have been inflexible because they were optimized for use on a particular type of network which expected to transmit specific types of communications. These prior protocols had fixed characteristics and were unable to adapt to changing user requirements and varying network parameters.

SUMMARY OF THE INVENTION

The difficulties in prior data communications systems are overcome, in accordance with an aspect of the invention, by a new data communications architecture wherein the high level communications services provided to a host processor system are arranged into independent horizontal functions that are processed in parallel, and interfaced to a provider of low-level network protocols and services as well as to an application layer of the host processor system. More specifically, conditional dependencies among the horizontal functions are resolved by a so called connector that interfaces the horizontal functions to an application layer of the host processor. Additionally, performance of the communication system is enhanced by allowing adaptive specification of a high-level protocol employed in the architecture for providing the high-level services. This adaptive specification may be intitiated in response to changing user requirements or varying network parameters. Then, a high-level protocol specification is obtained by choosing appropriate values for parameters of the horizontal functions which are parametrically programmable.

DETAILED DESCRIPTION

A data communication architecture, as is well known in the art, is a structured set of services and corresponding protocols that provide communication services to a host processor system running an application and communicating with a remote host processor system, over a transmission medium, typically a network. Data implies a representation of any type of information, for example, user files, voice, video or the like. Typically, these services and protocols of an architecture are divided into low-level, i.e., low-layer, services and protocols, and high-level, i.e., high-layer, services and protocols. Low-level services are well known in the art as the services provided by the physical layer, data link layer and the network layer of the International Standards Organization's Open Systems Interconnect (ISO/OSI) reference model. The high-level services are also well known in the art as the services provided by the transport layer, the session layer, the presentation layer and the application layer of the International Standards Organization's Open Systems Interconnect (ISO/OSI) reference model.

Figure 1:
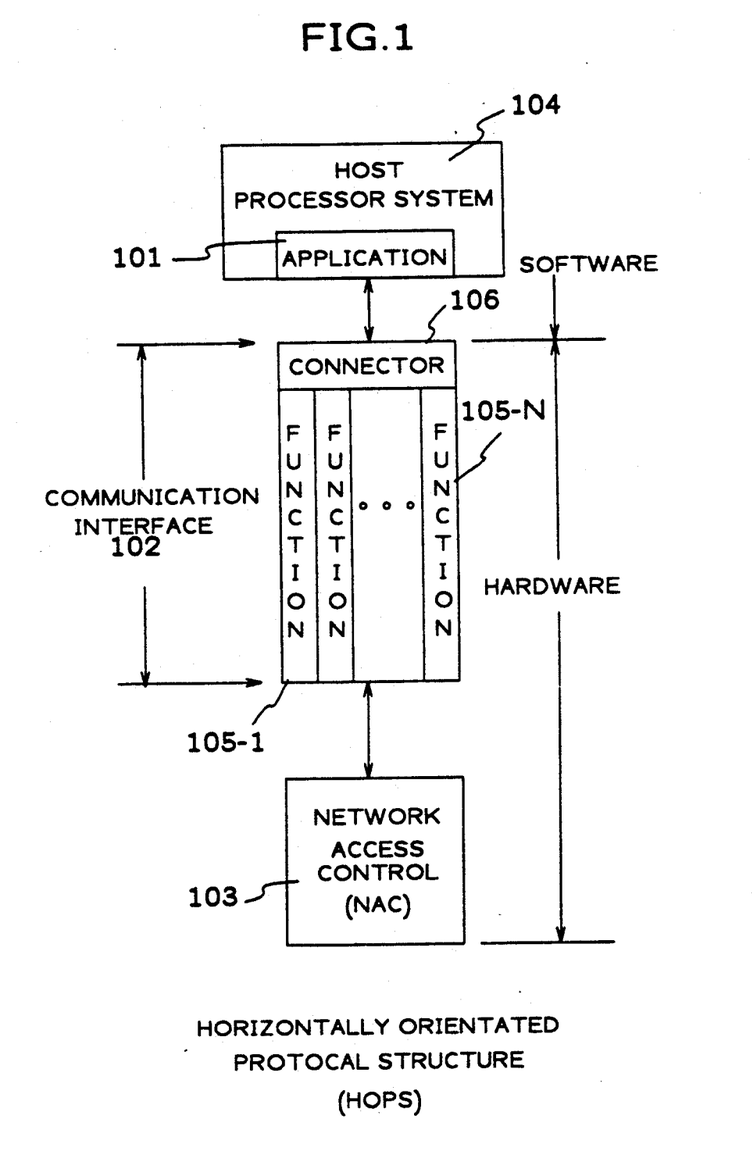
FIG. 1 shows, in simplified block diagram form, the architecture of the Horizontally Oriented Protocol Structure (HOPS) including aspects of the invention.

FIG. 1 shows, in simplified block diagram form, a unique data communication architecture known as the Horizontally Oriented Protocol Structure (HOPS), in accordance with an aspect of the invention. The horizontally oriented protocol structure architecture is divided into application layer 101, communication interface 102, and network access control 103. Application layer 101 includes software residing in host processor system 104 that provides a user application being processed by host processor software with the ability to communicate. Communication interface 102 is implemented in special purpose hardware to actually service a communication request as will be further explained. Network access control unit 103 passes information received from a network to communication interface 102. The received information, for the sake of clarity, will be referred to hereinafter as packets, but this convention should not be construed as limiting the scope of the invention. Additionally, network access control unit 103 transmits information from communication interface 102 to a network (not shown). The transmitted information is also referred to hereinafter as packets, which again should not be construed as limiting the scope of the invention. All the low-level services and the processing to realize them, are performed in network access control unit 103.

Communication interface 102 includes, in accordance with an aspect of the invention, independent horizontal functions 105-1 through 105-N and connector 106. Upon receipt of a packet from network access control unit 103, independent horizontal functions 105-1 through 105-N perform in parallel and in accordance with an aspect of the invention, all the processing required to transfer the data in a received packet to application layer 101. Any dependencies among independent horizontal functions 105 are then resolved by connector 106, and the resulting processed data is transferred to application layer 101. Data to be transmitted by application layer 101 to a remote location is passed through connector 106 to independent horizontal functions 105-1 to 105-N. Typically, in the transmit direction, connector 106 does not perform any operations on the data. The data is processed by appropriate ones of independent horizontal functions 105-1 to 105-N, in parallel, formed into packets, in this example, and passed to network access control unit 103 for transmission to a network. It is the novel arrangement of the protocol wherein its functionality is divided into conditionally independent horizontal functions that allows parallel implementation.

Figure 2:
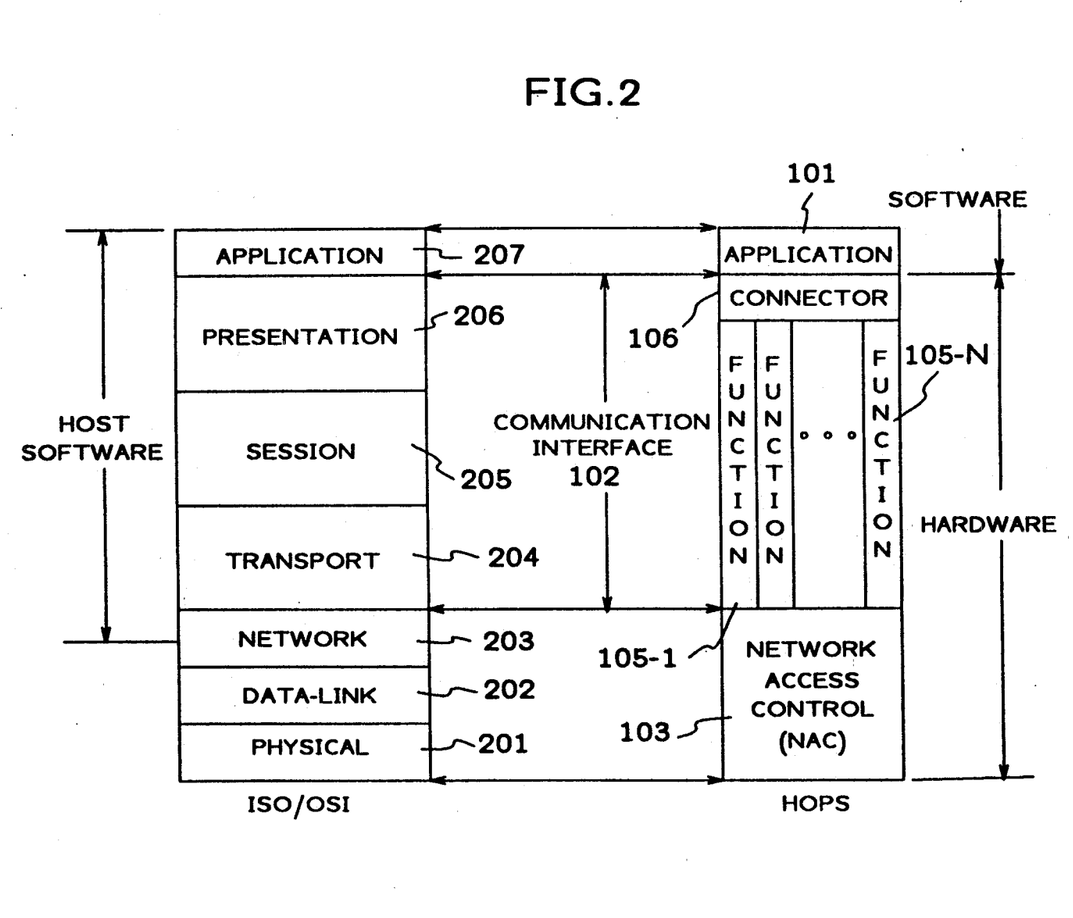
FIG. 2 shows, in simplified block diagram form, a comparison between the ISO/OSI reference model and the horizontally oriented protocol structure including aspects of the invention.

Shown in FIG. 2 is a comparison of the horizontally oriented protocol structure (HOPS) to the ISO/OSI standard reference model. As shown, network access control unit 103 of the horizontally oriented protocol structure corresponds functionally to the lower layers, namely, physical layer 201, data-link layer 202 and network layer 203, of the ISO/OSI model. Network access control unit 103 of the horizontally oriented protocol structure provides lower-level services to communication interface 102. Communication interface 102 of the horizontally oriented protocol structure implements the functionality of the higher-layers namely, transport layer 204, session layer 205 and presentation layer 206, of the ISO/OSI model. These higher layers of the ISO/OSI model were traditionally host processor system software based. Also, each higher layer was serially executed in sequence by the host processor system. Therefore, the time to process a packet received from the low level by the high level was the sum of the processing time for each of the high layers. Since processing speed has not kept pace with transmission speed, software based implementations of these layers constitute a bottleneck in the communication process. In contrast, communication interface 102 of the horizontally oriented protocol structure is based on special communication hardware. Additionally, independent horizontal functions 105-1 to 105-N are implemented in parallel, reducing the time to process a packet received from network access control unit 103 to the time for executing the most time consuming of independent horizontal functions 105-1 to 105-N and the short time required for connector 106 to resolve any dependencies among independent horizontal functions 105-1 to 105-N.

Figure 3:
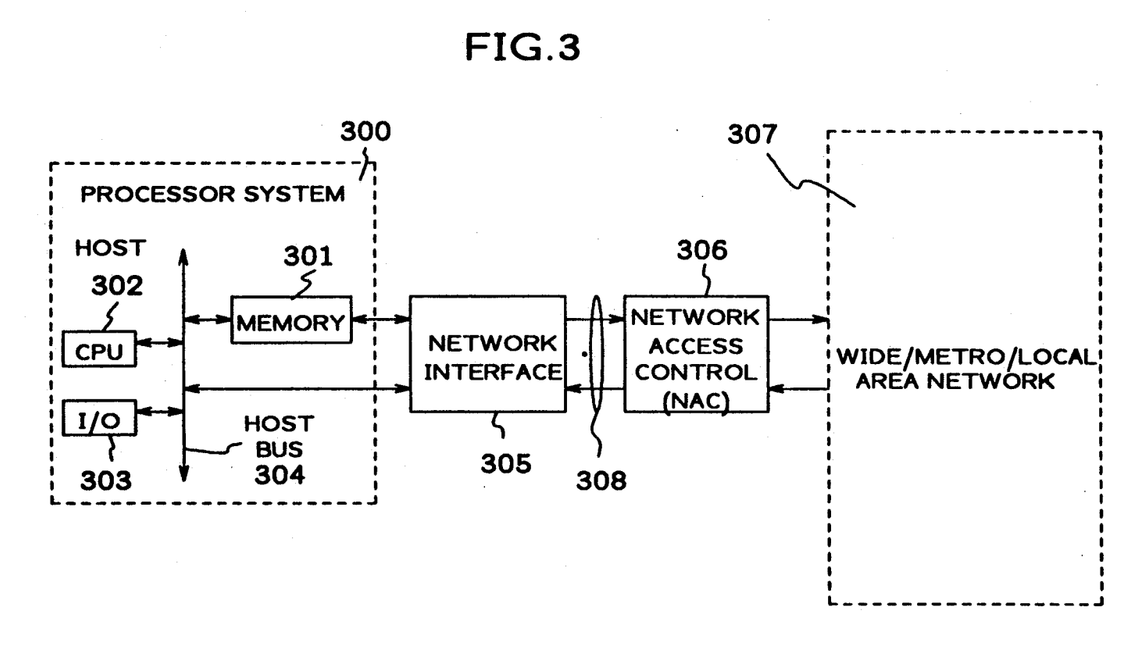
FIG. 3 shows, in simplified block diagram form, a hardware model of a host processor including aspects of the invention communicating over a network.

An example communication hardware model for implementing the horizontally oriented protocol structure architecture is shown in FIG. 3. Accordingly, shown are a host processor system 300 comprising dual port memory 301, central processing unit (CPU) 302, input/output (I/O) 303 and host bus 304. Also shown is network interface 305 which is coupled to memory 301 and host bus 304 and via a plurality of high speed transmission links 308 to network access control 306 for communication with network 307. Network 307 is, for example, a wide area packet network for interfacing with remote host processor systems (not shown). Software in host processor system 300 implements application layer 101 (FIG. 1) and its protocol. It is noted that a section of application layer 101 is generally implemented by the operating system of host processor system 300. Network interface 305, in this example, interconnects network access control 306 to host processor system 300 and implements the functionality of communication interface 102 (FIG. 1) of the horizontally oriented protocol structure architecture. Network interface 305 receives packets addressed to host processor system 300 from network 307 via network access control 306 and transmits from host processor system 300 output packets to network 307 via network access control 306.

The presented communication architecture and hardware model permits reduced involvement of host processor system 300 with the time consuming processing of communication. This reduced involvement is manifest in the processing of transport and presentation operations, session operations, and in decreased overhead in the communication between communication interface 102 (FIG. 1) and the operating system of host processor system 300. Additionally, embodiments of the horizontally oriented protocol structure that eliminate buffering and copying of information from the memory of the operating system of host processor system 300 into memory 301 of the user application are implementable. Communication interface 102, (FIG. 1) as implemented in network interface 305, can read and write data directly from and to, respectively, the locations of memory 301 allocated to application layer 101. This ability to directly read and write eliminates the involvement of the host processor system in the transfer of data to application layer 101. This result is realizable since memory 301 is a dual port memory. Dual port memory units are well known.

In an example embodiment, resequencing of packets, is performed directly in memory locations of application layer 101 located in memory 301. As part of the communication process, the application layer of a remote host processor system can require that a sequence of packets must be transferred in its entirety and in a prescribed order to application layer 101, i.e. the sequence of packets is a message. If such a transfer of packets is required, each arriving packet is placed, based upon its sequence number, into an appropriate section of memory 301 assigned to application 101. If the packets do not arrive in sequence number order, memory gaps are created, i.e., locations in memory are left unfilled, in anticipation of the arrival of as yet unarrived packets that are part of the sequence. The data from a packet that arrives with a sequence number for which a memory gap has been created is placed into the gap by writing the data into the memory locations assigned to the gap. The availability of the data from an entire sequence of packets is signaled to application layer 101 when all the packets comprising the sequence have been received and processed. Application layer 101 can then retrieve the data at any subsequent time without the need for any further copying or movement of the data. The data from the message is considered as being part of the generally available valid data assigned to application layer 101. Again, the sequencing and processing of the received packets is performed by horizontal functions 105-1 to 105-N (FIG. 1) and connector 106 which are implemented by the hardware model.

Further, in an example embodiment, communication interface 102 has access to the operating system scheduler and monitor tables of host processor system 300 through memory 301. These scheduler and monitor tables can be directly adjusted by communication interface 102 to indicate reception of a valid unit of data, e.g., a message. Also, these scheduler and monitor tables can be read by communication interface 102 to determine the presence of requests for communication services or the availability and location in memory 301 of data for transmission. Communication interface 102 then takes appropriate action to effect the communication, again without the involvement of host processor system 300. When the scheduler of host processor system 300 is invoked, it checks on the status of pending communication processes by referring to the scheduler and monitor tables. If paging is occurring, communication interface 102 is so informed in order to maintain accurate addressing.

Figure 4:
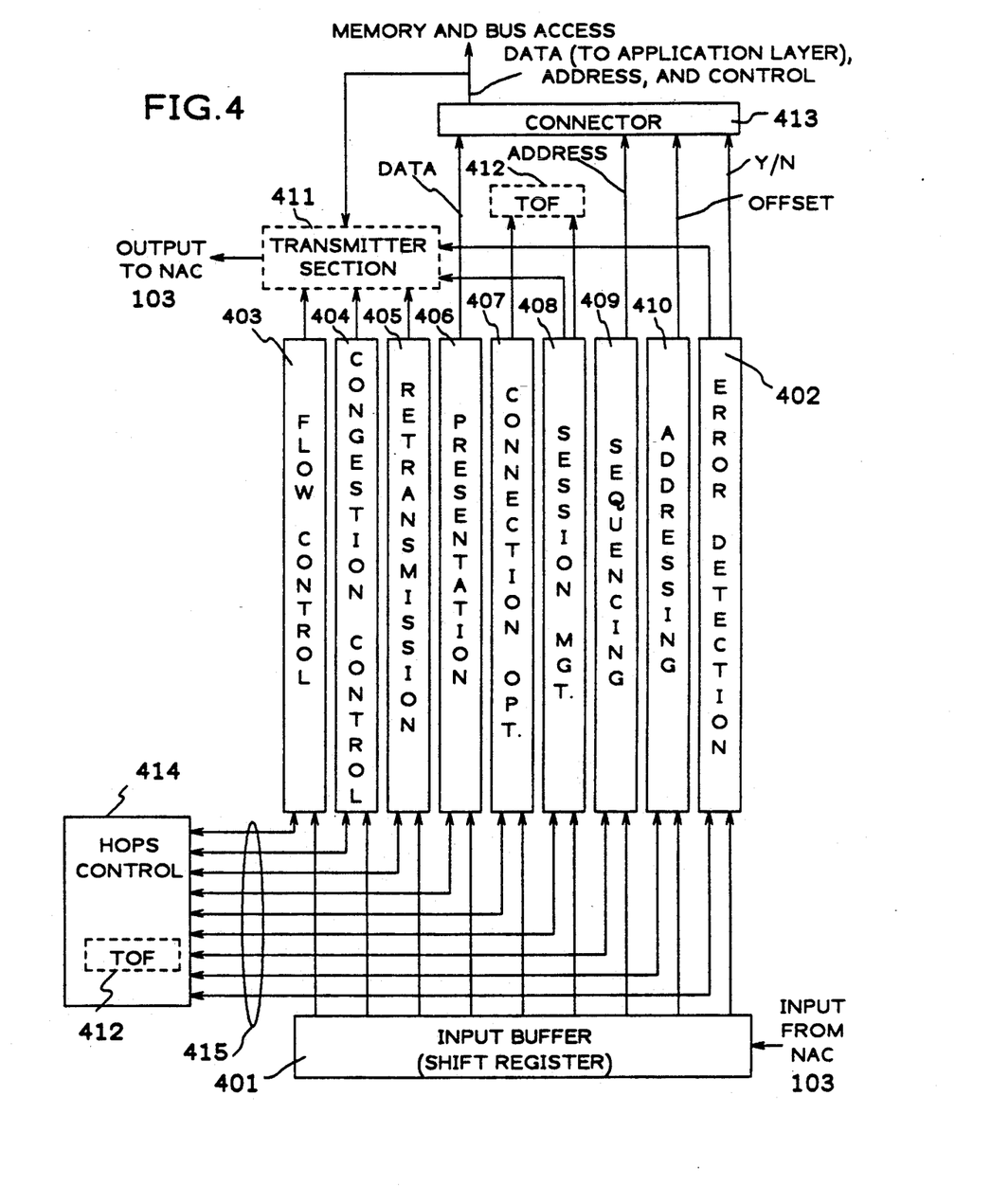
FIG. 4 shows, in simplified block diagram form, the flow of information between the various elements that implement the horizontal functions 105 of communications interface 102 (FIG. 1) as featured in an example implementation of the receive section of the horizontally oriented protocol structure.

FIG. 4 shows, in simplified block diagram form, the flow of information between the various sections of communication interface 102 as featured in an example implementation of the receive section of the horizontally oriented protocol structure. Packets received from network access control unit 103 are placed into input buffer 401 for storage during processing. The packet is then processed in parallel, in this example, by independent horizontal functions error detection 402, flow control 403, congestion control 404, retransmission 405, presentation 406, connection options 407, session management 408 and addressing 410. These independent horizontal functions are particular versions of independent horizontal functions 105-1 to 105-N of FIG. 1, which are implemented in this example.

Information extracted by independent horizontal functions error detection 402, flow control 403, congestion control 404, retransmission 405 and session management 408, is communicated to HOPS controller 414 over bi-directional channels 415. This information will be processed for purposes of adjusting the actions of the transmit side of the horizontal oriented protocol structure. Such processing can include but is not limited to changing polynomials used for detecting error, adjusting the values of transmission windows values, retransmitting packets and temporarily halting packet transmission. Although the actual processing and transfer of information to the transmit side is done by HOPS controller 414, for purposes of clarity of flow of information and function, independent horizontal functions error detection 402, flow control 403, congestion control 404, retransmission 405 and session management 408, are conceptualized as being connected to their transmit counterparts, represented by transmit section 411. The actual dual nature of the structure of the independent horizontal functions will be further defined in conjunction with FIG. 9, described below. Information extracted by connection options 407 and session management 408 is sent to update table of flows (TOF) 412. Table of flows 412 is a data structure maintained in network interface 305 which actually resides in HOPS controller 414 and keeps track of existing communication connections. HOPS controller 414 actually communicates with the independent horizontal functions over bi-directional channels 415. Table of flows (TOF) 412 is also shown here separate from HOPS controller 414, again, for clarity purposes. The information extracted by independent horizontal functions error control 402, presentation 406, sequencing 409 and addressing 410 is passed to connector 413. Connector 413 resolves any conditional dependencies that may exist in the information provided to it and supplies the resulting information to application layer 101.

A conditional dependency between functions is a state in which the results, i.e. output, of the execution of a first function depends on the results of the execution of a second function. If the required value(s) necessary to obtain the result of the second function are assumed, execution of the first function can proceed in parallel with the execution of the second function. The connector then compares the assumed value(s) with the actual value resulting from execution of the second function. The result of the first function in which the assumed value is equal to the actual value from execution of the second function is selected by the connector. If none of the assumed values match the actual result of the second function then the entire result from the execution of the first function may be abandoned. Alternatively, a conditional dependency may be resolved by computing any partial results of the first function that are independent of the second function and using the result from the second function to resolve the remaining portion of the computation for the first function. In this case, the remainder of the computation would be performed by connector 413.

Figure 5:
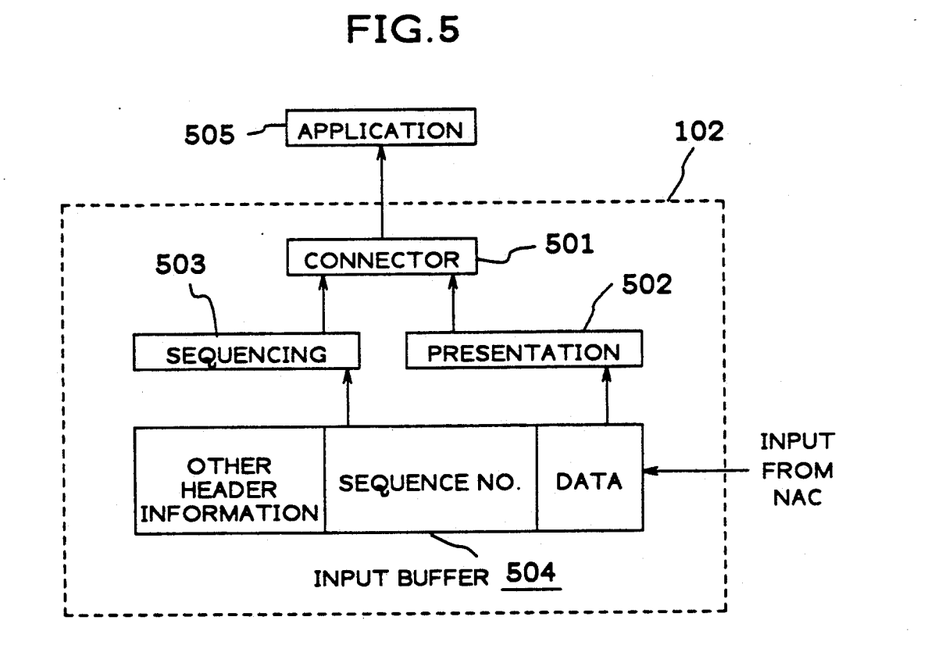
FIG. 5 shows a representative example of a receive section of a minimal functionality communications interface.
Figure 6:
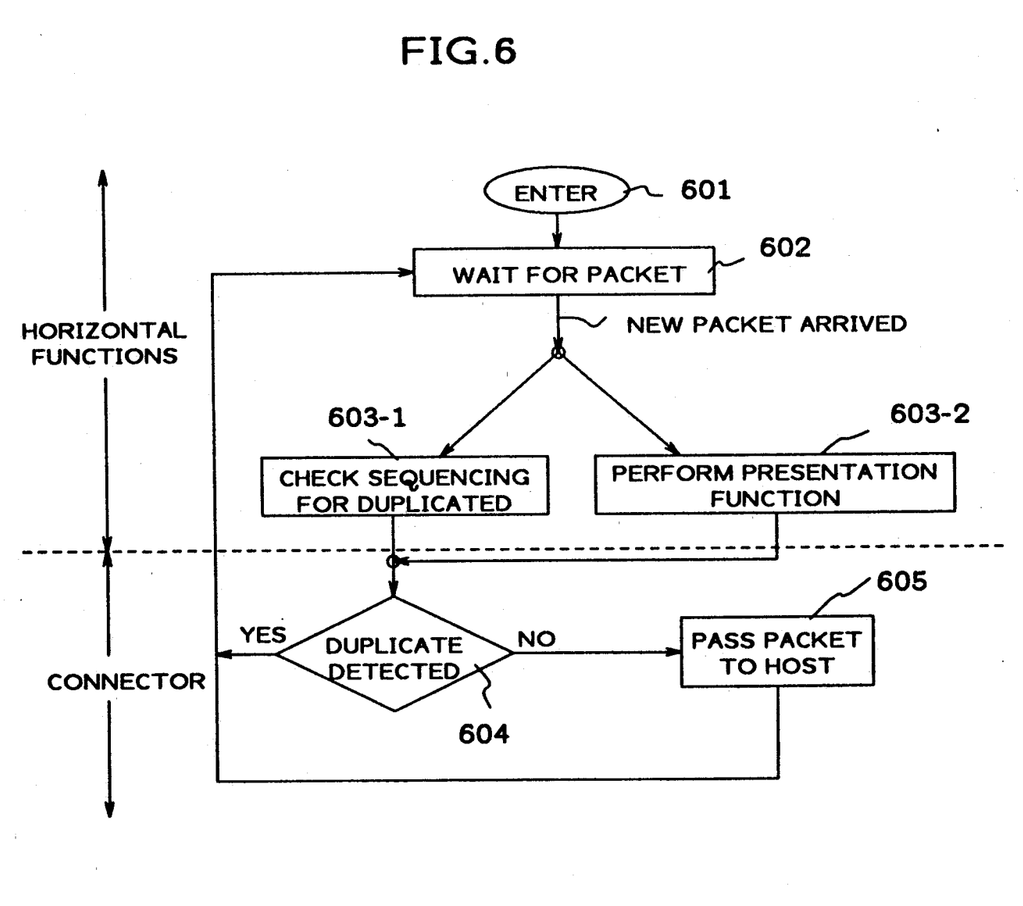
FIG. 6 shows, in flowchart form, the sequence of operations performed by the communications interface of FIG. 5 including resolution by a connector of the conditional dependencies in accordance with an aspect of the invention.

For brevity and clarity of description, a simple example of the operation of a communication interface using a connector, in accordance with an aspect of the invention, to resolve conditional dependencies is presented in FIG. 5 and FIG. 6. Shown in FIG. 5 is a representative example of the receive section of a minimal functionality communication interface including connector 501, two independent horizontal functions, namely, presentation 502 and sequencing 503, and input buffer 504. Connector 501 interfaces to application layer 505. The task of presentation 502 is to resolve any differences in format and data representation between application layer 505 on local host processor system 300 (FIG. 3) and an application layer in a remote host processor system with which application layer 505 is communicating with. This includes, for example, decryption of data received in an encrypted format. The data is then ready to be presented to application layer 501. The tasks of sequencing 503 includes checking packets for valid sequence numbers and checking packets for duplicate sequence numbers. The data in a packet that is determined to contain a duplicate or invalid sequence number must be discarded. The parallel performance of presentation 502 and sequencing 503 allows a conditional dependency between them to arise when presentation 502 would present the data from a packet to application layer 505, (which it has placed into the format required by the application layer), but sequencing 503 has determined that the packet is a duplicate and its data must be discarded. Thus, the results from presentation 502 actually given to application layer 505 ultimately depends upon sequencing 503. Both the data and an indication of whether the data must be discarded or not are forwarded to connector 501 which resolves the dependency as described below.

FIG. 6 shows the sequence of operations, in flowchart form, performed by the communication interface of FIG. 5, including resolution by connector 501 of the conditional dependency described above, in accordance with an aspect of the invention. Accordingly, the sequence is entered in step 601. Thereafter, in step 602 the communication interface waits for the arrival of a new packet. Upon receipt of a new packet, steps 603-1 and 603-2 are performed in parallel. Step 603-1 is the operation of the sequencing function which checks to see if the packet is a duplicate. Step 603-2 is the presentation function, where the data contained in the packet is processed and placed into the format required by application layer 501 (FIG. 5). After sequencing 503 has determined if the packet is a duplicate and whether or not it may be accepted, sequencing 503 passes its determination to connector 501. Connector 501 also receives the data for application layer 505 that was contained in the packet from presentation 502. The operation of connector 501 begins with conditional branch point 604 (FIG. 6) which tests to determine if a duplicate packet was detected in step 603-1 by sequencing 503. If the test result in step 604 is YES, the data from the packet is not passed to application layer 505 and control is passed back to step 602 to wait for the arrival of a new packet. If the test result in step 604 is NO, the data received from presentation 502 which resulted from the performance of the presentation function in step 603-2 is passed by connector 501 to application layer 505 in step 605. Control is then passed back to step 602 to wait for the arrival of a new packet.

The horizontally oriented protocol structure is intended to support communication over a diverse set of networks and for diverse application layers. Therefore, a single protocol cannot provide optimum performance. For example, the scheme for the retransmission of packets in cases of improperly received packets is determined by the protocol. The optimum retransmission scheme to be used depends on the quality of the network. Selective packet retransmission is better for networks with large average bit error rates, while go back and retransmit the last N packets may be beneficial in very reliable network transmission environments. Moreover, the requirements for a protocol may change with time and vary from subnet to subnet. (A subnet is a set of nodes, links and interfaces which are part of the communications network.) For example, increasing congestion may change retransmission policy or the required error control mechanism may differ from subnet to subnet. Therefore, in accordance with an aspect of the invention, the horizontally oriented protocol structure incorporates adaptive specification of the actual protocol to be used. Communication interface 102 receives information concerning user requirements and network transmission conditions and specifies, via HOPS controller 414 (FIG. 4), an optimum protocol to be used. Independent horizontal functions 402 through 410, in this example, are parametrically programmable and are capable of receiving parameter values from HOPS controller 414 via bi-directional channels 415. It is noted as shown in FIG. 1 that there can be N such horizontal functions. Thus, a protocol is specified by determining the values of the parameters that are to be employed by independent horizontal functions 402 through 410. The values of the parameters, and thus the protocol, may be changed and updated by HOPS controller 414. In addition to specifying parameters, HOPS controller 414 exchanges information with independent horizontal functions via bi-directional channels 415. Channels 415 transmit status information from the independent horizontal functions to HOPS controller 414 and transmit control information from HOPS controller 414 to the independent horizontal functions. Information received by HOPS controller 414 is used by it to determine the values it specifies for use in the protocol.

Figure 7:
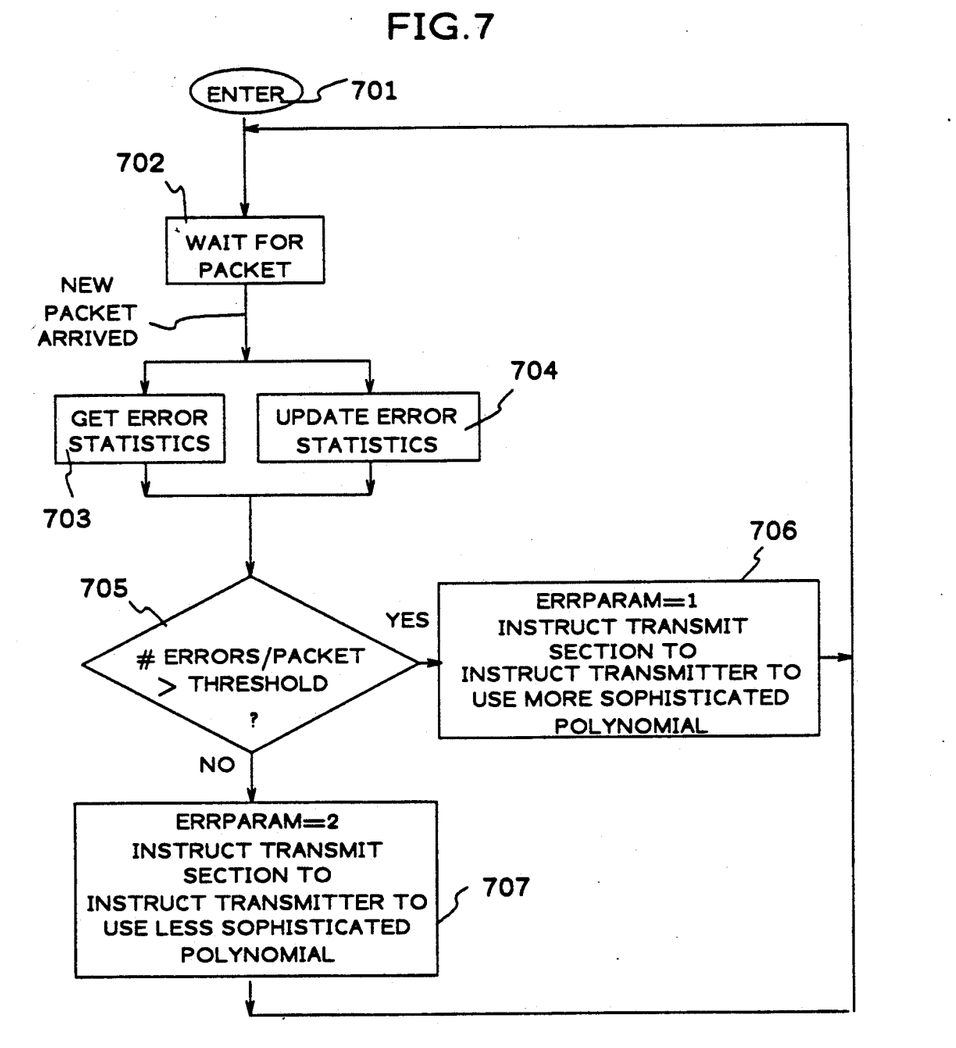
FIG. 7 depicts, in flow chart form, an example decision mechanism employed by HOPS controller 414, of FIG. 4, to specify an error control protocol.

For brevity and clarity of description, FIG. 7 depicts, in flow chart form, an example decision mechanism employed by HOPS controller 414 to specify the error detection protocol. In this example, each packet uses a polynomial based cyclic redundancy check for the detection of errors in the data section of a packet. The polynomial appropriate for use depends on the error statistics. The polynomial to be used must be agreed upon by both the local host processor system and the remote host processor system for valid communication to take place. Thus, determining the appropriate polynomial, in this example, determines the error protocol. The parameter that determines the error protocol is, in this example, called ERRPARAM. ERRPARAM can be assigned a value of 1 or 2. A value of 1 assigned to ERRPARAM specifies a more sophisticated error protocol while a value of 2 assigned to ERRPARAM specifies a less sophisticated error protocol as discussed below.

Accordingly, the sequence is entered on communication start up via step 701 wherein initialization of the error statistic is performed. Thereafter, the system waits in step 702 until a new packet arrives. When a new packet arrives, control is passed to step 703 and step 704 in parallel. In step 703 HOPS controller 414 retrieves the error statistic. The error statistic, in this example, is a time average of error distribution. It is maintained by HOPS controller 414 (FIG. 4). Simultaneously, in step 704, the error statistic is updated based upon information concerning errors in the current packet from independent horizontal function error detection 402. Next, conditional branch point 705 tests if the errors statistic is greater than THRESHOLD. In this example, THRESHOLD is a value representative of a fixed predetermined percentage of packets received with errors. If the test result in step 705 is YES, control is passed to step 706 wherein HOPS controller 414 specifies the error protocol. This specification is done by setting the value of ERRPARAM to 1 and communicating the value to the transmit section of the error detecting function (FIG. 9) over the appropriate one of bi-directional channels 415. The error detecting function, upon receipt of the new value for ERRPARAM proceeds to use the more sophisticated one of a set of two (2) predetermined polynomials to calculate the error detecting code, i.e., cyclic redundancy check. Such polynomials, methods of detecting error and their relative sophistication are well known to those skilled in the art. Then, control is passed back to step 702 to wait for another packet. If the test result in step 705 was NO, then in step 707, HOPS controller 414 specifies the error protocol. Again, the specification is done by setting the value of ERRPARAM. In this case ERRPARAM is set to 2 and its value is communicated to the transmit section of the error detecting function (FIG. 9) over the appropriate one of bi-directional channels 415. The error detecting function, upon receipt of the new value for ERRPARAM proceeds to use the predetermined less sophisticated polynomial of the set of polynomials in the error detecting code. Again, such polynomials, methods of detecting error and their relative sophistication are well known to those skilled in the art. Control then passes back to step 702 to wait for another packet. As mentioned, the polynomial to be used must be agreed upon by both the local host processor system and the remote host processor system for valid communication to take place. Thus, the value of the parameter for the error protocol is specified, in this example, by determining the appropriate polynomial.

Figure 8:
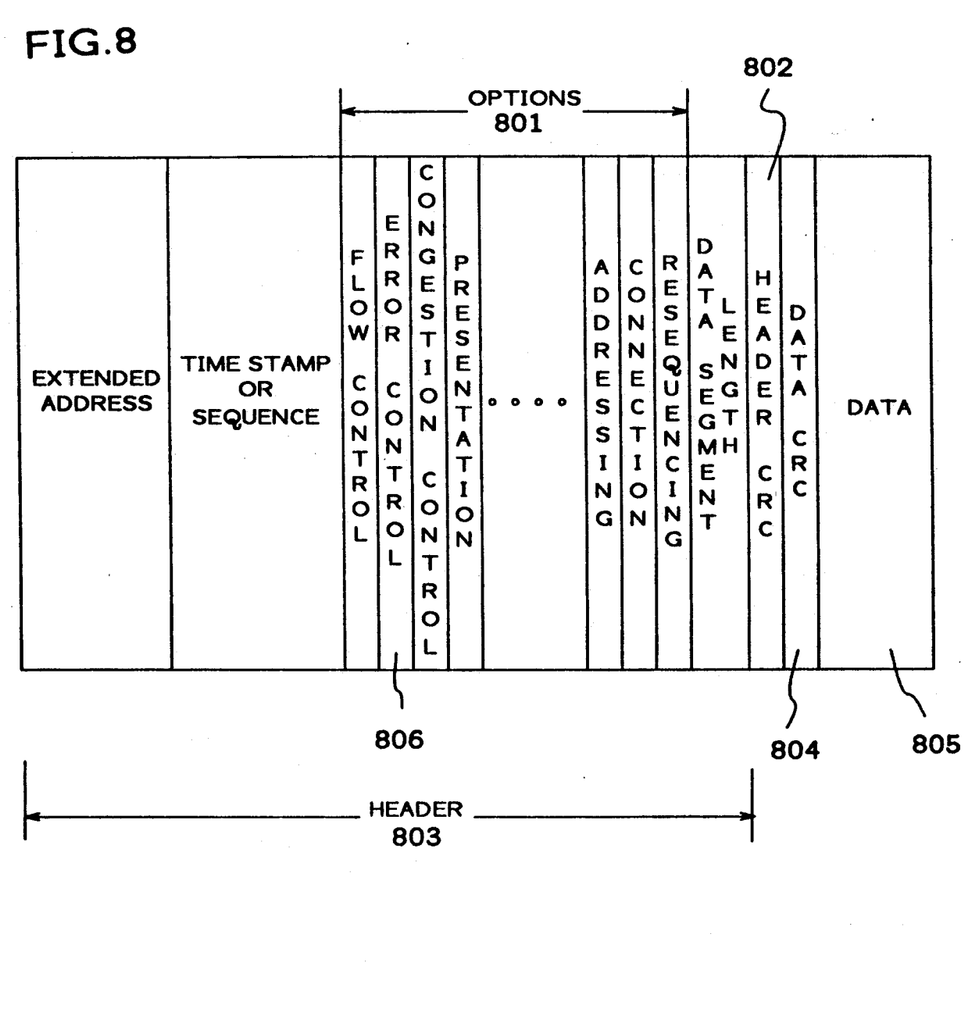
FIG. 8 depicts a packet format, illustrating an aspect of the invention.

The current values of the parameters in the specified protocol are communicated throughout the network. This communication of parameters may be done by using special option fields 801 in an example packet format, as shown in FIG. 8. In this example, the packet format has two cyclic redundancy checks (CRC). A first cyclic redundancy check header CRC 802 is calculated based only on information contained in fields of header 803. A second cyclic redundancy check data CRC 804 is calculated based only on information contained in data field 805. A cyclic redundancy check, as mentioned above, is an error checking and correcting code based on a specified polynomial. It is again noted that for this example, the operation of HOPS controller 414 as shown in FIG. 7 in determining the particular polynomial used to calculate the cyclic redundancy check applies only to data CRC 804 for data field 805. Determination of the validity of header 803 at the remote location, is based upon a single fixed predetermined polynomial for calculating header CRC 802 (since headers are normally short there is usually no need for complex polynomials). The example packet format shown in FIG. 8 includes error-control field 806 which is examined upon packet receipt by error detection 402 to determine which polynomial to use for calculating the cyclic redundancy check for the data in the packet. Alternatively, special packets may be sent for the express purpose of communicating the function parameter values throughout the network.

Figure 9:
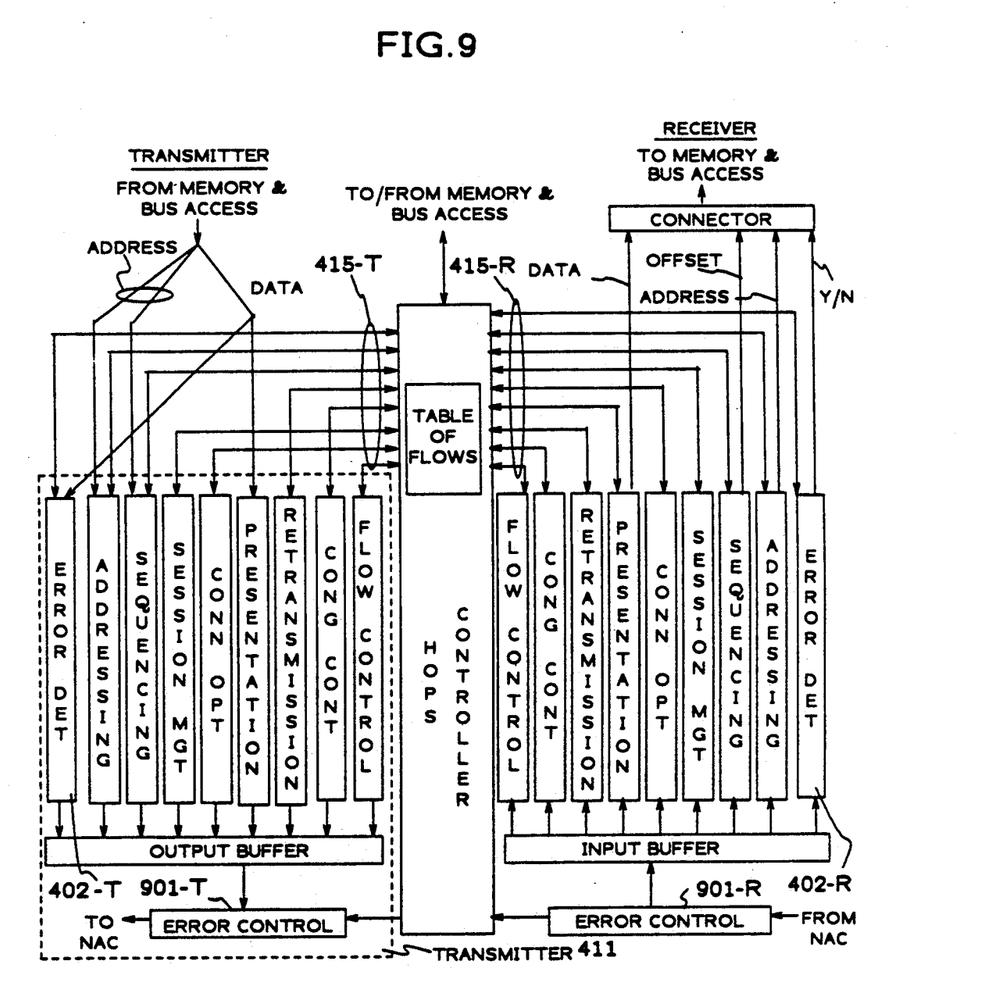
FIG. 9 shows an example of both the transmit and receive sections of an embodiment of communications interface 102.

Shown in FIG. 9 is an example of both the transmit and receive sections of communication interface 102. This should clarify the interconnection and integration of the various elements discussed above. Thus, this example shows that the table of flows is actually maintained in the HOPS controller, as mentioned. Also, as discussed, a connector in the transmit direction generally performs no function and therefore is not shown. The symmetrical nature of the receive and transmit sections of the independent horizontal functions is shown. Each function is denoted by the same number assigned to it in FIG. 4 with an additional denotation of "R" for the receive section and "T" for the transmit section. Note that FIG. 9 does not imply any particular implementation or limit the scope of the invention in any way. Further, error correction abilities are implemented in error control unit 901. This error correction is done "on the fly", i.e., at the same time as the packet is being transferred from network access control 103 to input buffer 401. Any errors not correctable are then detected by independent horizontal function error detection 402. HOPS controller 414 communicates with error control unit 901 in the same manner as with the independent horizontal functions, i.e. via one of bi-directional channels 415.

I claim:

1. Apparatus for providing high-level non-application layer services between low-level services interfacing a network and application layer services of a host processor, the apparatus being characterized by:
   a plurality of independent parallel horizontally oriented function means for providing a plurality of high-level communication services;
   means for interfacing said plurality of parallel horizontally oriented function means to said low-level services; and
   means for interfacing said plurality of parallel horizontally oriented function means to said application layer services, said means for interfacing to said application layer includes means for resolving dependencies among said plurality of parallel horizontally oriented function means.

2. The apparatus as defined in claim 1 wherein each of said plurality of parallel horizontally oriented function means includes means for receiving and responding to parametric programming.

3. The invention as defined in claim 1 further including means for adaptively specifying as actual high-level protocol to be used in communication between said high-level service means of said host processor and a high-level services providing means of another host processor attached to said network.

4. The invention as defined in claim 3 wherein said means for adaptively specifying said actual high-level protocol to be used determines the actual protocol in response to a determination of changed user requirements.

5. The invention as defined in claim 4 wherein said means for adaptively specifying said actual high-level protocol to be used determines the actual protocol in response to a determination of variations in network transmission conditions.

6. The invention as defined in claim 3 further including means for communicating a specification of said specified protocol between said high-level service means of said host processor and a high-level services providing means of another host processor in said network.

7. The invention as defined in claim 3 further including means for generating and transmitting special packets containing a representation of a specification of a section of said specified protocol and means for interfacing said special packets to said network.

8. The invention as defined in claim 3 further including means for generating one or more special option fields to be included in a header of a packet, said one or more special option fields containing a representation of a specification of a section of said specified protocol is represented and means for inserting said generated option fields into said packet header.

9. The invention as defined in claim 3 wherein each of said plurality of parallel horizontally oriented function means includes means for receiving and responding to parametric programming and said means for adaptively specifying said actual high-level protocol to be used includes means for choosing values of parameters to be used by said independent horizontal functions.

10. The invention as defined in claim 9 further including means for receiving special packets wherein a specification of a section of said specified protocol is represented and means for changing values of parameters used by said independent horizontal functions in response to said received representation.

* * * * *